Figure 1:
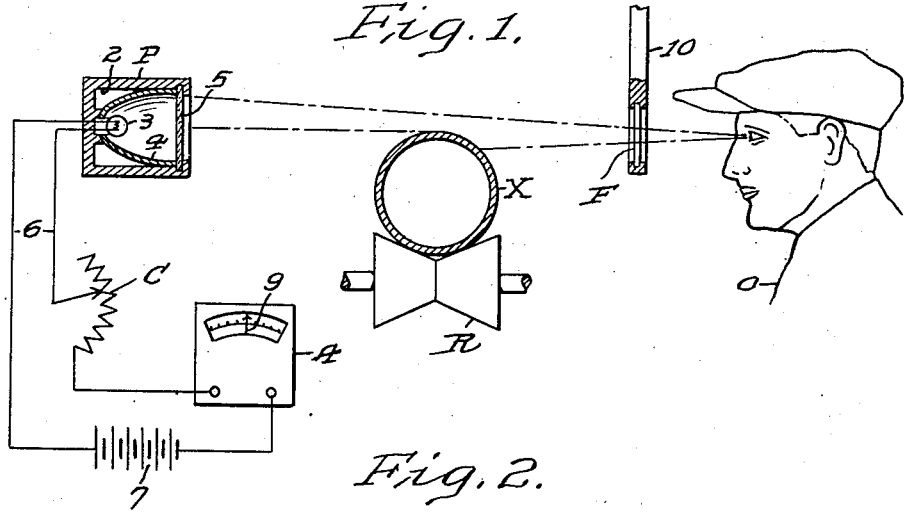

May 15, 1934.　　　　　B. F. ANTHONY　　　　　1,958,879
APPARATUS FOR ASCERTAINING THE TEMPERATURE OF HOT BODIES
Filed Oct. 31, 1929

INVENTOR
Benjamin F. Anthony

ATTORNEYS

Patented May 15, 1934

1,958,879

UNITED STATES PATENT OFFICE 1,958,879

APPARATUS FOR ASCERTAINING THE TEMPERATURE OF HOT BODIES

Benjamin F. Anthony, Youngstown, Ohio

Application October 31, 1929, Serial No. 403,766

1 Claim. (Cl. 88—14)

In the manufacture of pipe, bars, rods and numerous other articles it is customary to determine the temperature thereof when and as required by means of optical pyrometers or photometers of the usual well known construction and which in form and method of use therefore approximate a telescope, the instrument being provided with a barrel having an eye-piece at one end through which the body whose temperature is to be measured is viewed when the instrument is directed upon it. Instruments of this general character necessarily impose a material strain on the operator when continuously utilized for an extended period such as the usual eight-hour working shift, particularly in those cases where the objects pass before the observer very rapidly, as for example, small pipes which during manufacture are frequently ejected from a heating furnace near which the observer is stationed at a rate of approximately two per minute. This results in the observer having to view through the photometer about one thousand objects during an eight-hour working shift which, it is found in practice, not only imposes an undue nerve, eye and muscle strain upon him but also, in consequence thereof, affects to some extent his optical judgment or accuracy of his observations toward the end of the working period. Moreover, as the cost of photometers or similar pyrometric devices in general use for the purposes to which I have referred is high and as large numbers of them are required in the operation of steel plants and the like, the expense incident to their installation and maintenance is a material one with resulting ultimate enhancement of the cost of the product in connection with which they are used.

An object of the present invention, therefore, is the provision of a novel method of ascertaining the temperature of hot bodies, as well as of apparatus suitable for its performance, by the use of which the fatigue and strain imposed on the observer is materially lessened, with consequent advantage not only as regards the physical well being of the observer himself but also in that the accuracy of his observations toward the end of his working period is improved and a higher average accuracy thus maintained throughout said period.

A further object of the invention is to reduce the cost both for installation and maintenance of the instruments required for the temperature determination incident to the manufacture of numerous classes of articles by providing apparatus of very simple and inexpensive form by means of which the desired temperature determination can be conveniently effected with sufficient accuracy for most commercial requirements.

Other objects, advantages and novel features of design, construction and arrangement comprehended by the invention are hereinafter more particularly mentioned or will be apparent to those skilled in the art from the following description of the manner of performing the same by the use of apparatus such as is illustrated in the accompanying drawing of a preferred embodiment of my invention and of a certain modified form thereof.

Figure 2:
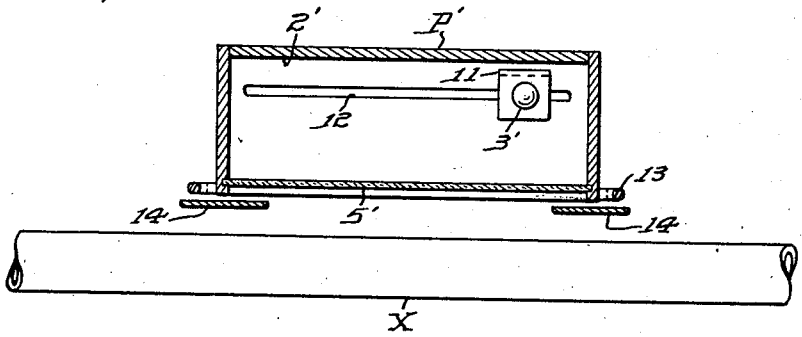
Figure 3:
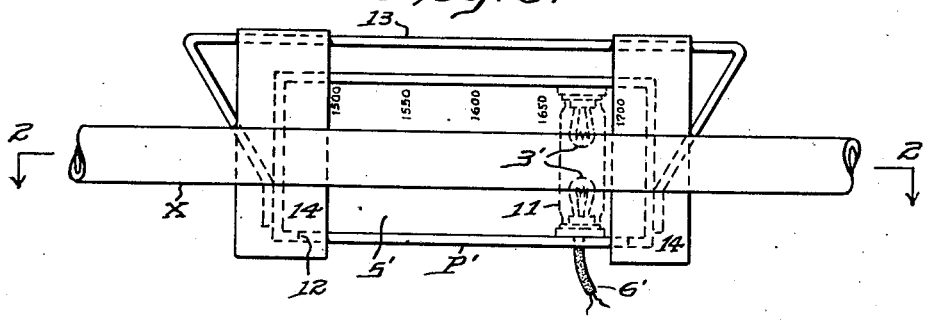

As the details of construction of the said apparatus are capable of considerable variation and as the particular form thereof will frequently vary in accordance with the particular conditions under which the temperature determination is to be made, it will be understood that the said illustrations of the apparatus are of substantially diagrammatic character and depict certain forms of apparatus suitable for ascertaining the temperature of pipes as they are passed before the observer as, for example, during their transit from a heating furnace to a station where they are to be subjected to some further operation or treatment incident to their manufacture. Thus, in Fig. 1, I have illustrated diagrammatically a preferred form of my invention in operative association with a pipe, shown in section, to be considered as having just been delivered from the heating furnace, the light projector comprising an incandescent bulb mounted in a casing enclosing a parabolic reflector; Fig. 2 is a horizontal section through a light projector to be employed in a somewhat modified form of my invention whereby light varying in intensity through any given range within predetermined limits may be exhibited for comparison with the body whose temperature is to be determined and which greatly facilitates ascertaining whether or not the temperature of the body lies within the corresponding temperature range; Fig. 3 is a front elevation of the said light projector, the lines 2—2 and the arrows in Fig. 3 indicating the plane and direction of the view shown in Fig. 2. Since in practising my invention with the aid of the modified form of apparatus shown in Figs. 2 and 3, other apparatus to be employed in association therewith may be substantially the same as that shown and to be described in association with the preferred form of my invention and is capable of equally variant modification, I deem it unnecessary to illustrate these parts as it is believed that the structure and operation of the modified form of my invention will be clear from the drawing and from the description hereinafter of my preferred and modified forms.

As shown in Fig. 1, the apparatus of my preferred form comprises some suitable means such as a plurality of rollers R forming a path along which the pipe X or other object whose temperature is to be ascertained may be passed before the observer O, it being of course understood that the pipe is heated sufficiently to exhibit a distinct color. Arranged on the opposite side of the pipe or other object from that on which the observer is stationed is a projector, generally designated as P and which comprises a suitable casing 2 in which is disposed an illuminant 3 conveniently in the form of an electric lamp. The illuminant may be arranged at the focus of a parabolic or other suitable reflector 4 directed toward the object while the front end of the casing, that is, the end adjacent the object, is provided with a ground glass or other suitable means for diffusing the light projected therethrough by the illuminant and reflector. The illuminant 3 is included in a circuit 6 in which is also included a battery 7 or other means for supplying the necessary current to the illuminant, a rheostat C or other means by which the current flowing to the illuminant may be controlled and, preferably, an ammeter or other indicating instrument A having a scale graduated in degrees of temperature and cooperating with a registering hand 9. On the opposite side of the object from that on which the projector is disposed is arranged a monochromatic filter F which may be stationarily supported in a frame 10 or in any other convenient way, the filter being of such size and so positioned that the observer when looking through the filter can simultaneously observe a portion of the object and a portion of the light diffusing screen 5 of the projector as indicated by the broken lines defining the observer's field of view when sighting through the filter upon the object and projector which latter, it will be noted, is so disposed that a portion of its screen is visible behind the object.

In practice the rheostat C and indicating instrument A, if the latter be employed, that is, if the rheostat is not provided with a scale directly graduated in degrees of temperature in which case the indicating instrument may be omitted from the circuit are, in practice, located in a convenient position for manipulation and observation respectively by the observer when he is looking through the monochromatic filter F.

In operation the observer merely sights through the monochromatic filter as the object X passes before him along the rollers or other means on which it is supported, and while thus simultaneously viewing the object and the exposed portion of the projector screen, photometrically matches the latter with the object by suitable manipulation of the rheostat of other controlling device of the circuit and, when this matching is substantially obtained, then reads the temperature directly from the scale of the indicating instrument.

Of course many modifications may be made in this apparatus if desired such, for example, as the inclusion of some form of shutter for controlling the light emitted through the screen of the projector or the inclusion of temperature recording instruments in the circuit for giving a permanent record of the temperature of the various objects measured as they pass through the field of the instrument as will be readily understood by those familiar with the art, but the employment of such devices is not essential and their inclusion or omission is therefore but a matter of choice.

Thus, apparatus constructed in accordance with the preferred form of the invention as hereinabove described may advantageously be used for determining the temperature of a series of objects which are to be maintained within a certain temperature range by disposing two of the instruments side by side and respectively adjusting the illuminants thereof to the upper and lower limits of the permitted range of temperature, that is, by adjusting the illuminant of one instrument to photometrically match the objects when heated to the upper limit of the range and the illuminant of the other instrument to photometrically match the objects when heated to the lower limit of the range. Under these conditions both instruments can be readily watched by one observer and any object passing through their field whose temperature does not fall within the permitted range can be readily detected.

It may, however, under such circumstances, be more convenient to employ my modified form of light projector P' illustrated in Figs. 2 and 3 which will now be more fully described with reference to the said drawing and to the above description of my preferred form. Thus, the casing 2' is preferably of a somewhat elongated form and may be lined with a suitable light reflecting or diffusing material such as polished sheet metal or may be painted white on the inside to avoid too great absorption of light by the walls of the casing. The light source may comprise a pair of incandescent bulbs 3' suitably mounted on a plate 11 to permit their being moved longitudinally of the casing and along the slot 12 in the bottom and through which the wires 6' carrying the necessary current may be led to suitable connections with the current source. The screen 5' which I employ in this form of projector and the purposes of which will hereafter appear may be a sheet of ground glass similar to that employed in my preferred form and of constant thickness throughout. Above the casing 2' and mounted thereon I provide the cross bar 13 from which may be suspended curtains or slides 14 adapted to be moved longitudinally across the face of the screen. As the intensity of the light passing through the screen is greater at that portion of the screen most nearly adjacent the light, gradually decreasing as the distance from the light is increased, the screen exhibits a light of gradually varying intensity, within limits which may be controlled by the position of the light source in the projector, by the current supplied to the light, or by the position of the slides 14 in front of the screen. In the operation of this form of my invention, therefore, a rheostat controlling the intensity of the current passing through the light bulb may be set to maintain constant the brilliancy of the light, and the slides 14 moved along the cross bar until the exposed portion of the screen exhibits a field of light the limits of intensity of which correspond to the temperature limits permitted to the body which are to be observed. Thus, when the body X having a temperature within the said limits is passed before the screen and viewed through the monochromatic filter provided as shown in Fig. 1 or as viewed by the observer through goggles having monochromatic lenses, the disappearance of any portion of the body as a result of the intensity of its light exactly matching that of the portion of the screen in front of which it is passing will indicate that the temperature of the body is within the desired limits and consequently when no portion of the body, when observed through the monochromatic filter, disappears before the screen, such failure to disappear indicates that the temperature of the body is outside the limits allowed and for which the apparatus has been set. It will be understood that in this form of the invention it is contemplated that a gradually varying light intensity be exhibited by the screen and that therefore if desired instead of employing a single light source adjacent one end of the casing, a plurality of bulbs may be mounted in a row in the casing and separately connected to rheostats whereby the intensity of the light emitted by each may be controlled so that the screen will exhibit the desired varying intensity.

If desired the screen may, with the aid of an optical pyrometer or otherwise, be calibrated in temperature zones for any given light intensity along the screen and thus serve to indicate the temperature corresponding to that portion of the light screen against which the body whose temperature is determined seems to disappear, this calibration being particularly desirable when a definite temperature determination is required, as distinguished from a determination only that the temperature is within certain limits.

It will be noted that in accordance with the present invention the monochromatic filter may be made of relatively large size so the observer can conveniently sight therethrough on the object and on the projector without the necessity of bringing the eye very close to a small eyepiece or corresponding part through which it is necessary to sight when using the ordinary photometer or other pyrometric measuring device and further, that the object is interposed between the filter and the projector instead of the illuminant and monochromatic filter being both arranged in the barrel of the photometer in the ordinary manner. Thus, even though the objects whose temperature is to be measured are passing very rapidly before the observer, the strain incident to observing them and photometrically matching the light of the projector with that of the objects is relatively slight, while as the observer can readily shift his position from time to time without impairing his ability to make the necessary observations, he can work for considerably longer periods without becoming unduly fatigued than is possible with the forms of photometers and other pyrometric devices heretofore customarily employed for similar purposes, thus increasing the average accuracy of his observations throughout the period of his employment.

In place of using a fixed monochromatic filter, the observer under certain conditions may be provided with goggles having monochromatic lenses through which he can simultaneously observe the object and projector just as in the case of the apparatus heretofore described and frequently with even more freedom of movement and lessened strain.

It will thus be apparent that I have devised a novel method of ascertaining the temperature of heated objects as well as a novel form of apparatus satisfactorily operative for its performance and that both said method and apparatus may be advantageously employed under many conditions encountered in practical manufacturing operations more satisfactorily, at less cost, with less strain on the observer and frequently with increased accuracy of observation than the methods and instrumentalities heretofore utilized for similar determinations.

While I have herein described with considerable particularity one manner of performing my improved method as well as apparatus suitable therefor, I do not thereby desire or intend to confine myself solely thereto as modifications may be made in the method itself and numerous changes incorporated in the apparatus, without departing from the spirit and scope of the invention as defined in the appended claim.

Having thus described my invention, I claim and desire to protect by Letters Patent of the United States:

Apparatus for ascertaining the temperature of a hot body comprising means for supporting the body, a source of light on one side thereof, means for varying the intensity of said light, means affording a direct temperature reading in accordance with the adjustment of said intensity varying means, and a monochromatic filter arranged on the other side of the body in the path of light rays from said source tangent to said body and so disposed that both said source and said body may be simultaneously observed therethrough while the light is photometrically matched with the body by operation of said intensity varying means.

BENJAMIN F. ANTHONY.